(12) United States Patent
Pfeifer et al.

(10) Patent No.: US 7,007,204 B2
(45) Date of Patent: *Feb. 28, 2006

(54) METHOD FOR PROVIDING CABLE ISOLATION IN A FIBRE CHANNEL TEST ENVIRONMENT

(75) Inventors: Alan Thomas Pfeifer, Kechi, KS (US); Darin Scott Frazier, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 618 days.

This patent is subject to a terminal disclaimer.

(21) Appl. No.: 10/271,027

(22) Filed: Oct. 15, 2002

(65) Prior Publication Data

US 2004/0073848 A1    Apr. 15, 2004

(51) Int. Cl.
*G06F 11/00* (2006.01)
(52) U.S. Cl. .......................... 714/41; 714/43; 370/248; 703/21; 703/25
(58) Field of Classification Search ................ 714/41, 714/43; 370/248; 703/21, 25
See application file for complete search history.

(56) References Cited

U.S. PATENT DOCUMENTS

| | | | | |
|---|---|---|---|---|
| 5,001,712 A | * | 3/1991 | Splett et al. ................ 714/703 |
| 5,862,362 A | * | 1/1999 | Somasegar et al. ........... 703/21 |
| 5,894,566 A | * | 4/1999 | Croslin ........................ 703/21 |
| 6,182,248 B1 | * | 1/2001 | Armstrong et al. ........... 714/43 |
| 6,600,739 B1 | * | 7/2003 | Evans et al. ................ 370/362 |
| 6,625,761 B1 | * | 9/2003 | Sartore et al. ................ 714/43 |
| 2002/0108076 A1 | * | 8/2002 | Barenys et al. ............... 714/43 |

* cited by examiner

*Primary Examiner*—Robert Beausoliel
*Assistant Examiner*—Michael Maskulinski
(74) *Attorney, Agent, or Firm*—Yee & Associates, P.C.

(57) ABSTRACT

A cable isolator is provided for automatically performing cable breaks for testing of host bus adapters. A workstation includes a host bus adapter, such as a Fibre Channel storage controller, to be tested. The host bus adapter is connected to one or more storage modules through the cable isolator. The cable isolator includes two transceivers, one of which is connected to the host bus adapter and the other being connected to the storage modules. The two transceivers are also connected to each other internally. The cable isolator also includes a programmable logic device or controller that is used to enable and disable the two transceivers at set intervals. When the cable connection is to be broken, the programmable logic device generates one or more output disable signals. The one or more output disable signals are then provided to the transceivers to perform the cable break. An on-time and an off-time may be set using switches or dials.

24 Claims, 5 Drawing Sheets

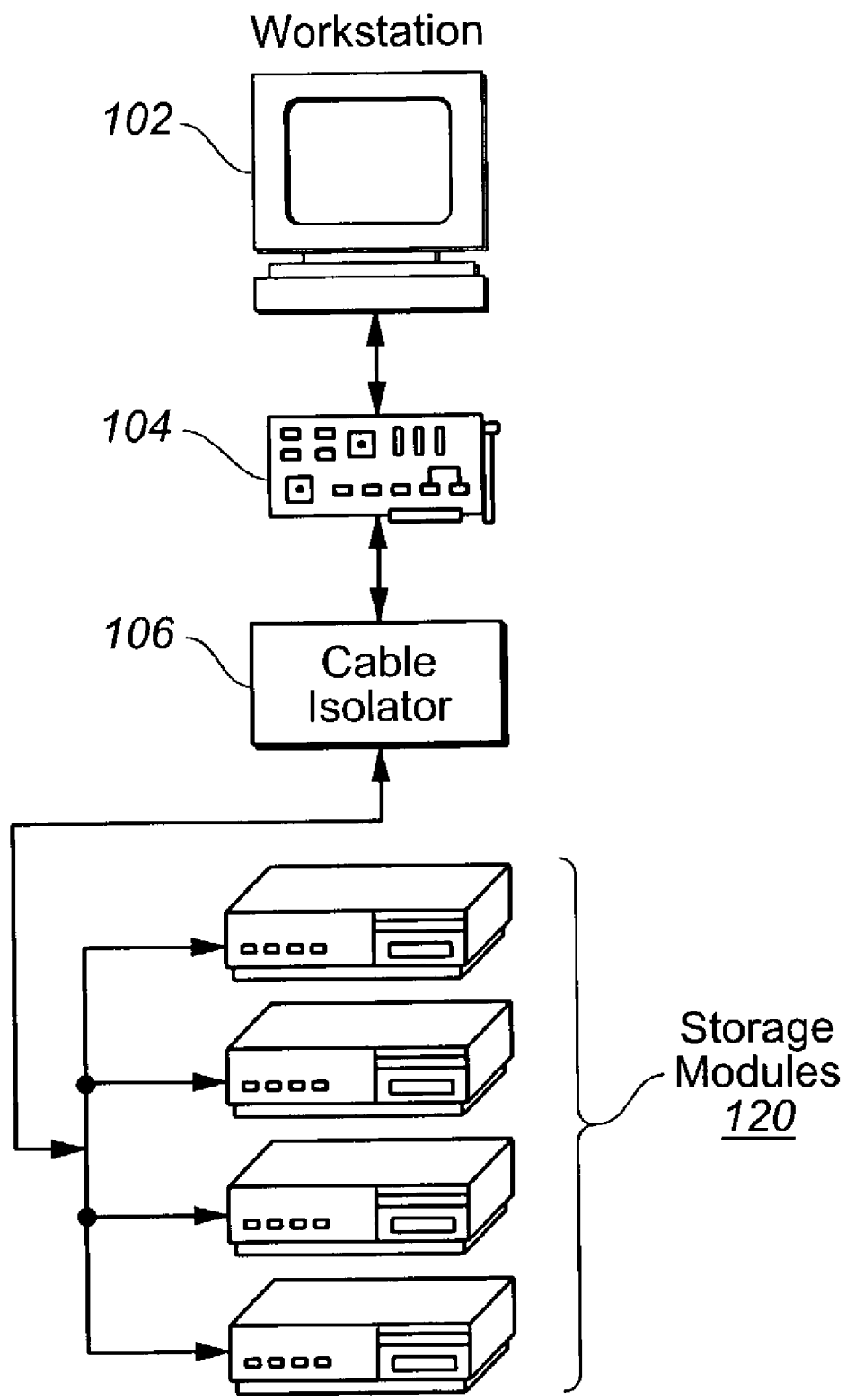
FIG._1

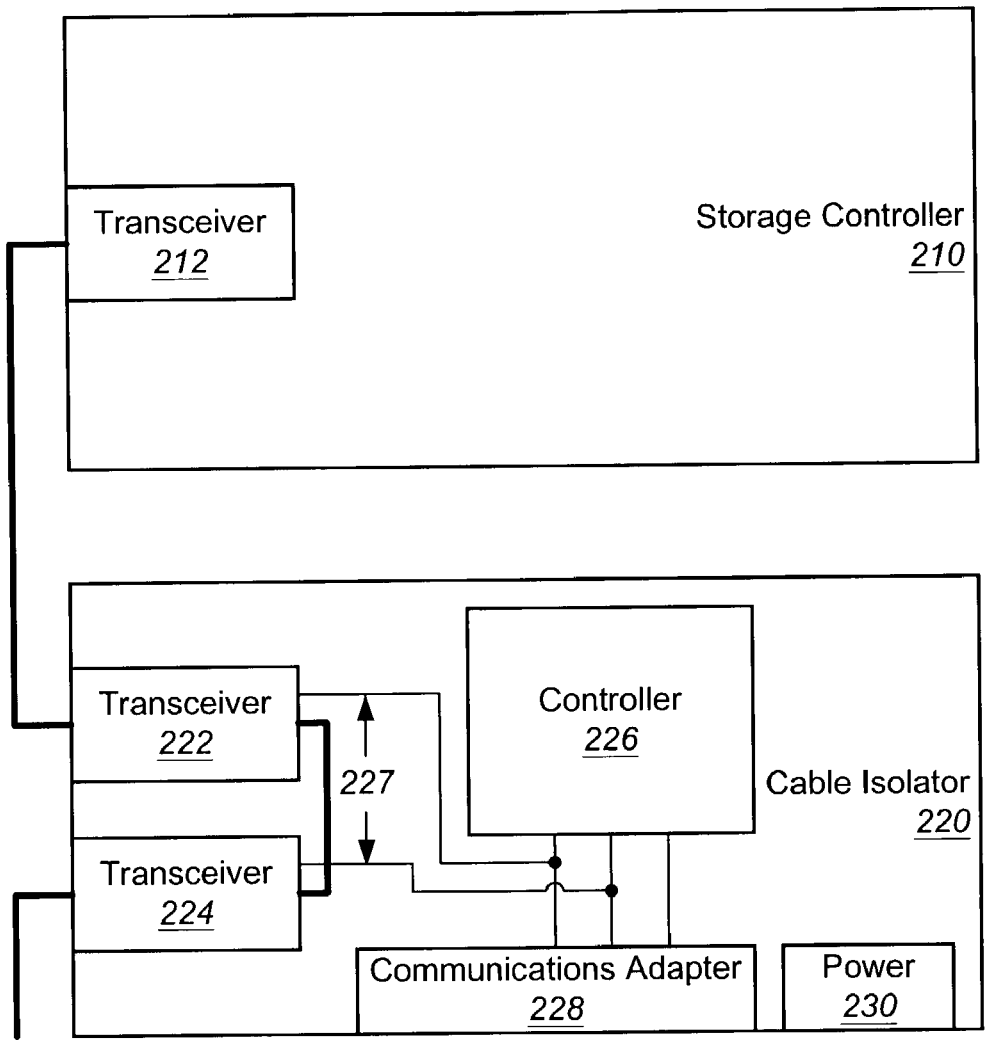
FIG._2

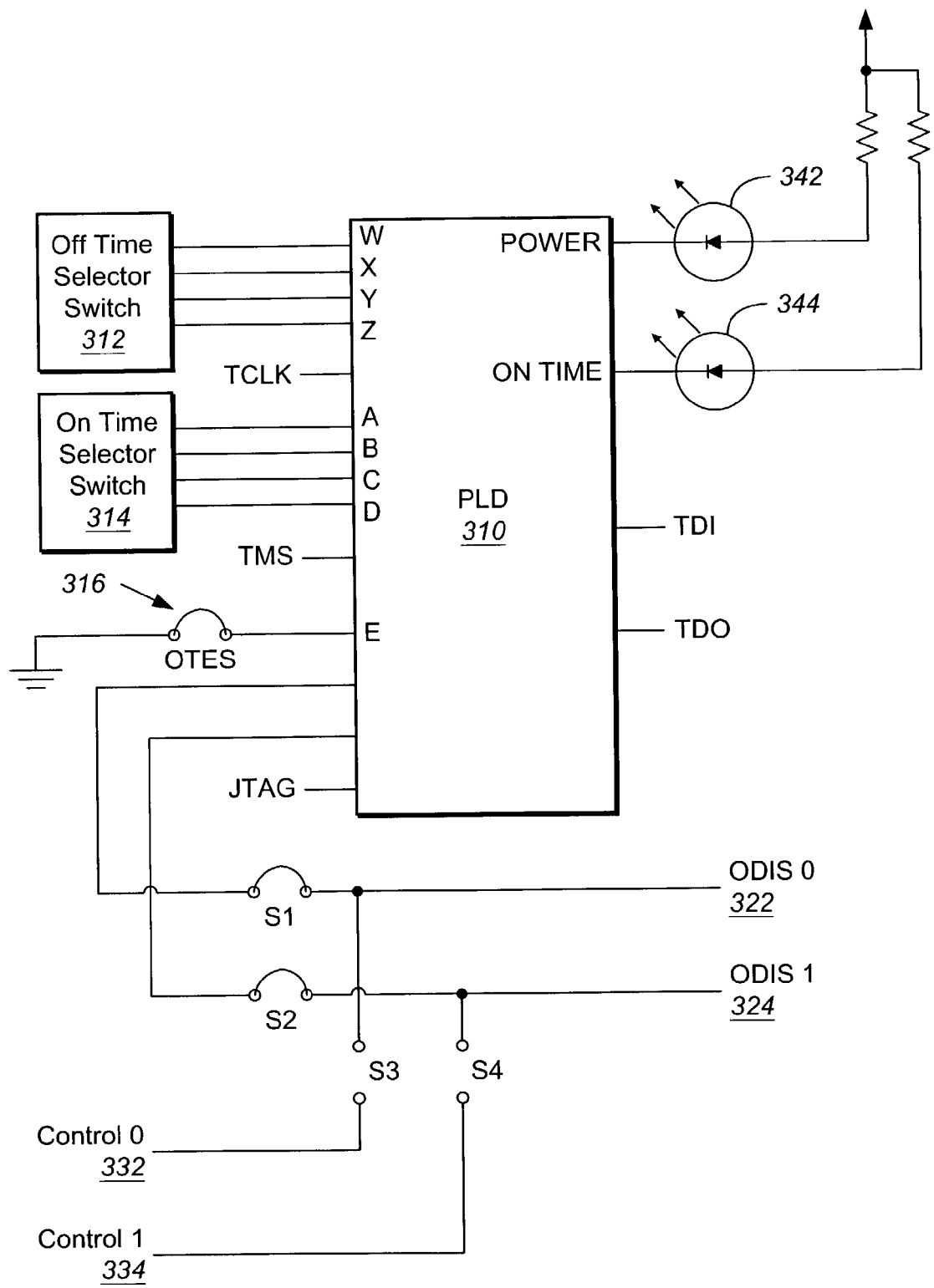
FIG._3

ON Time Table 410

| E | D | C | B | A | Hex | Time (s) |
|---|---|---|---|---|-----|----------|
| 0 | 0 | 0 | 0 | 0 | 0 0 | 30 |
| 0 | 0 | 0 | 0 | 1 | 0 1 | 40 |
| 0 | 0 | 0 | 1 | 0 | 0 2 | 50 |
| 0 | 0 | 0 | 1 | 1 | 0 3 | 60 |
| 0 | 0 | 1 | 0 | 0 | 0 4 | 70 |
| 0 | 0 | 1 | 0 | 1 | 0 5 | 80 |
| 0 | 0 | 1 | 1 | 0 | 0 6 | 90 |
| 0 | 0 | 1 | 1 | 1 | 0 7 | 100 |
| 0 | 1 | 0 | 0 | 0 | 0 8 | 120 |
| 0 | 1 | 0 | 0 | 1 | 0 9 | 130 |
| 0 | 1 | 0 | 1 | 0 | 0 A | 140 |
| 0 | 1 | 0 | 1 | 1 | 0 B | 150 |
| 0 | 1 | 1 | 0 | 0 | 0 C | 160 |
| 0 | 1 | 1 | 0 | 1 | 0 D | 170 |
| 0 | 1 | 1 | 1 | 0 | 0 E | 180 |
| 0 | 1 | 1 | 1 | 1 | 0 F | 190 |
| 1 | 0 | 0 | 0 | 0 | 1 0 | 200 |
| 1 | 0 | 0 | 0 | 1 | 1 1 | 210 |
| 1 | 0 | 0 | 1 | 0 | 1 2 | 220 |
| 1 | 0 | 0 | 1 | 1 | 1 3 | 230 |
| 1 | 0 | 1 | 0 | 0 | 1 4 | 240 |
| 1 | 0 | 1 | 0 | 1 | 1 5 | 250 |
| 1 | 0 | 1 | 1 | 0 | 1 6 | 260 |
| 1 | 0 | 1 | 1 | 1 | 1 7 | 270 |
| 1 | 1 | 0 | 0 | 0 | 1 8 | 280 |
| 1 | 1 | 0 | 0 | 1 | 1 9 | 290 |
| 1 | 1 | 0 | 1 | 0 | 1 A | 300 |
| 1 | 1 | 0 | 1 | 1 | 1 B | 310 |
| 1 | 1 | 1 | 0 | 0 | 1 C | 320 |
| 1 | 1 | 1 | 0 | 1 | 1 D | 330 |
| 1 | 1 | 1 | 1 | 0 | 1 E | 340 |
| 1 | 1 | 1 | 1 | 1 | 1 F | 350 |

1 minute
2 minutes
3 minutes
4 minutes
5 minutes

FIG._4A

OFF Time Table 420

| Z | Y | X | W | Hex | Time (s) |
|---|---|---|---|-----|----------|
| 0 | 0 | 0 | 0 | 0 | 2 |
| 0 | 0 | 0 | 1 | 1 | 4 |
| 0 | 0 | 1 | 0 | 2 | 6 |
| 0 | 0 | 1 | 1 | 3 | 8 |
| 0 | 1 | 0 | 0 | 4 | 10 |
| 0 | 1 | 0 | 1 | 5 | 12 |
| 0 | 1 | 1 | 0 | 6 | 14 |
| 0 | 1 | 1 | 1 | 7 | 16 |
| 1 | 0 | 0 | 0 | 8 | 18 |
| 1 | 0 | 0 | 1 | 9 | 20 |
| 1 | 0 | 1 | 0 | A | 22 |
| 1 | 0 | 1 | 1 | B | 24 |
| 1 | 1 | 0 | 0 | C | 26 |
| 1 | 1 | 0 | 1 | D | 28 |
| 1 | 1 | 1 | 0 | E | 30 |
| 1 | 1 | 1 | 1 | F | 32 |

FIG._4B

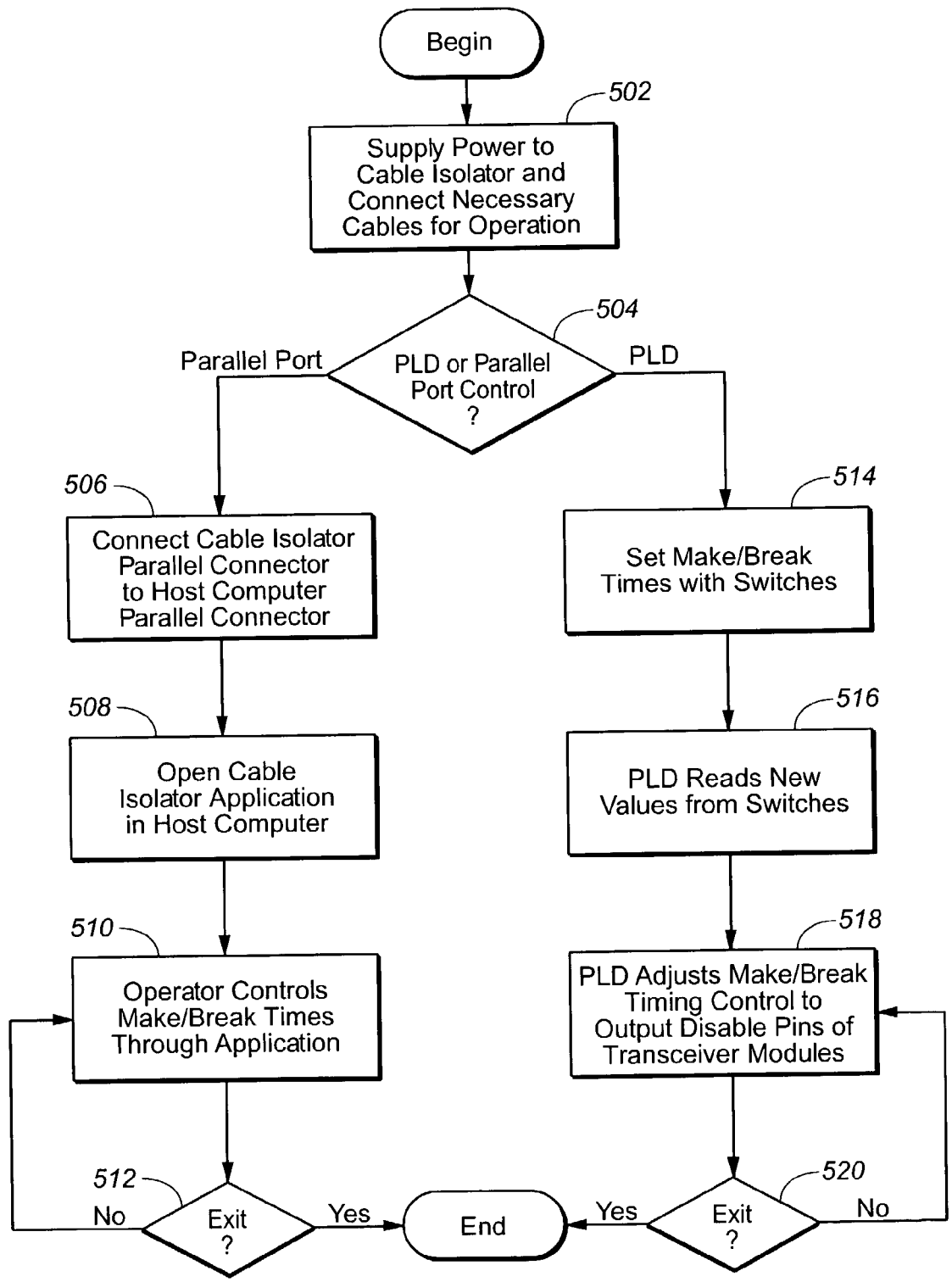
FIG._5

METHOD FOR PROVIDING CABLE ISOLATION IN A FIBRE CHANNEL TEST ENVIRONMENT

RELATED APPLICATIONS

The present application is related to commonly assigned and co-pending U.S. patent application Ser. No. 10/271,281 entitled "METHOD FOR PROVIDING CABLE ISOLATION IN A FIBRE CHANNEL TEST ENVIRONMENT USING A SOFTWARE DRIVEN PCI DEVICE," filed on even date herewith, and hereby incorporated by reference.

BACKGROUND OF THE INVENTION

1. Technical Field

The present invention relates to testing of host bus adapters and, in particular, to testing for proper recovery of a host bus adapter when a cable break occurs. Still more particularly, the present invention provides a method and apparatus for automatically performing cable breaks for host bus adapter testing.

2. Description of the Related Art

Fibre Channel is a high-speed transport technology used to build storage area networks (SANs). Fibre Channel can be configured point-to-point, via a switched topology, or in a Fibre Channel Arbitrated Loop (FCAL) with or without a hub, which can connect up to 127 nodes. Fibre Channel supports transmission rates up to 2.12 Gbps in each direction.

A Fibre Channel host bus adapter is typically connected to one or more storage modules by a cable. If the connection is broken, then data may not be properly written to or read from the storage modules. Host bus adapters may be designed to recover from cable breaks. However, testing the recovery of adapters is difficult. An operator may test the host bus adapter by manually pulling the cable from the connector in the adapter. However, this is time consuming and does not utilize the time and effort of engineers or technicians in a positive and cost-effective manner. Cable connections may also be broken by using relays. However, relays are not well suited for use with 2 Gbps Fibre Channel signals.

Therefore, it would be advantageous to provide an improved method and apparatus for automatically performing cable breaks for testing host bus adapters.

SUMMARY OF THE INVENTION

The present invention provides a cable isolator for automatically performing cable breaks for testing of host bus adapters. A workstation includes a host bus adapter, such as a Fibre Channel storage controller, to be tested. The host bus adapter is connected to one or more storage modules through the cable isolator. The cable isolator includes two transceivers, one of which is connected to the host bus adapter and the other being connected to the storage modules. The two transceivers are also connected to each other internally. The cable isolator also includes a programmable logic device or controller that is used to enable and disable the two transceivers at set intervals. When the cable connection is to be broken, the programmable logic device generates one or more output disable signals. The one or more output disable signals are then provided to the transceivers to perform the cable break.

An on-time and an off-time may be set using switches or dials. The programmable logic device then enables the transceivers, thus "making" the cable connection, for a time duration corresponding to the set on-time. When the on-time expires, the programmable logic device disables the transceivers, thus "breaking" the cable connection, for a time duration corresponding to the set off-time. The programmable logic device may be programmed to set on-times and off-times for various values received from the switches or dials. This programmable logic device may be programmed by an external device, such as a notebook computer or hand-held device, using a communications port. Also, the workstation or external device may have a cable isolator software application installed thereon. An operator may set periodic on-time and off-time values and minimum and maximum random values through the cable isolator software application.

In addition, the cable isolator may include a communications port, such as a parallel port, to allow the cable isolator to be controlled by an external device, such as a notebook computer or hand-held device. The external device may be programmed to randomly or periodically perform cable breaks by generating output disable signals.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram illustrating a workstation in a host bus adapter testing environment in accordance with a preferred embodiment of the present invention;

FIG. 2 is a block diagram illustrating a configuration of a storage controller and a cable isolator in accordance with a preferred embodiment of the present invention;

FIG. 3 is a schematic diagram illustrating an example configuration of a hardware controlled cable isolator in accordance with a preferred embodiment of the present invention;

FIGS. 4A and 4B depict example on-time and off-time tables for a hardware controlled cable isolator in accordance with a preferred embodiment of the present invention; and FIG. 5 is a flowchart illustrating the operation of a hardware controlled cable isolator in accordance with a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a diagram is shown illustrating a workstation in a host bus adapter testing environment in accordance with a preferred embodiment of the present invention. Workstation 102 includes host bus adapter 104. Cable Isolator 106 is installed between the host bus adapter and storage modules 120.

The cable isolator is programmed to break and remake cable connections at random or preset intervals. The ability of the host bus adapter to recover from the cable breaks can be tested in this manner. Host bus adapter 104 may be installed as an expansion card within workstation 102. The cable isolator includes two transceivers, one of which is connected to the host bus adapter and the other being connected to the storage modules. The two transceivers are also connected to each other internally. In a preferred embodiment of the present invention, the two transceivers are small form factor pluggable (SFP) transceivers, which are the same type of receivers used in a host bus adapter.

The cable isolator also includes a programmable logic device or controller that is used to enable and disable the two transceivers at set intervals. When the cable connection is to be broken, the programmable logic device generates one or more output disable signals. The one or more output disable signals are then provided to the transceivers to perform the cable break. The cable isolator may be hardware controlled through switches or dials. Alternatively, the cable isolator may be software controlled through workstation 102 or another external device, such as, for example, a notebook computer or hand-held device.

In another embodiment, cable isolator 106 may be installed as an expansion card within workstation 102. For example, the cable isolator may be embodied as a Peripheral Component Interconnect (PCI) card connected to the PCI bus of the workstation. The workstation may have a cable isolator driver and software application installed thereon. An operator may set periodic on-time and off-time values and minimum and maximum random values through the cable isolator software application. The workstation, under control of the cable isolator software application, may then control the programmable logic device, such as a PCI device, through the expansion bus.

With reference now to FIG. 2, a block diagram is shown illustrating a configuration of a storage controller and a cable isolator in accordance with a preferred embodiment of the present invention. Storage controller 210 includes transceiver 212 for transmitting and receiving access requests. In accordance with a preferred embodiment of the present invention, storage controller 210 is a Fibre Channel host bus adapter. Cable isolator 220 includes transceivers 222, 224 and controller 226. Transceiver 222 connects to transceiver 212 of the storage controller. Transceiver 224 connects to the storage devices. The two transceivers 222, 224 are also connected to each other internally.

Controller 226 generates output disable signals 227 to disable transceivers 222, 224. By disabling the output of the transceivers, the controller breaks the connection between the storage controller and the storage devices. The controller 226 may also deassert output disable signals 227 to remake the cable connection. The ability of the storage controller to recover from a cable break can be tested in this manner. The controller may be programmed to repeatedly disable and enable the transceivers for random or preset intervals. The controller may be programmed through communications adapter 228. Alternatively, the controller may disable and enable the transceivers under the control of an external device connected via communications adapter 228. The cable isolator 220 operates under the power of power 230.

In a preferred embodiment of the present invention, controller 226 is a programmable logic device, such as a complex programmable logic device. The controller may receive on-time and off-time values from switches and/or dials. In an alternative embodiment, controller 226 may be a microprocessor or a PCI device that operates under the control of an external device via communications adapter 228.

FIG. 3 is a schematic diagram illustrating an example configuration of a hardware controlled cable isolator in accordance with a preferred embodiment of the present invention. Programmable logic device (PLD) 310 receives off-time values from off time selector switch 312. The PLD also receives on-time values from on time selector switch 314 and on-time extension switch 316.

Off time selector switch 312 and on time selector switch 314 may be hexadecimal switches that generate sixteen possible values across four binary lines. For example, off time selector switch 312 generates a value between zero and sixteen (0-F hexadecimal) based on the position of an off-time switch or dial. For illustration, the bits of the off-time value are represented as W, X, Y, and Z, where W is the lowest order bit and Z is the highest order bit.

Similarly, on time selector switch 314 generates a value between zero and sixteen (0-F hexadecimal) based on a position of an on-time switch or dial. The on-time value may be extended to five binary bits (values between zero and thirty-two) using on-time extension switch (OTES) 316. The OTES may be, for example, a simple mechanical switch, shunt, or jumper. For illustration, the bits of the on-time value are represented as A, B, C, D, and E, where A is the lowest order bit and E is the highest order bit. The E bit is set by OTES 316.

PLD 310 generates output disable signal 0 (ODIS 0) 322 and output disable signal 1 (ODIS 1) 324 based on the off-time and on-time values. The cable isolator outputs the ODIS 0 and ODIS 1 signals generated by PLD 310 when switches S1, S2 are closed. The PLD may be bypassed by opening switches S1, S2 and closing switches S3, S4. In this case, ODIS 0 and ODIS 1 may be generated by an external device through control 0 332 and control 1 334. Control 0 and control 1 may be received through a communications adapter, which may connect to an external device through, for example, a parallel cable.

In addition, PLD 310 may be programmed using the TCLK, TMS, JTAG, TDI, and TDO signals. These signals may also be received through a communications adapter, such as a parallel port. Furthermore, PLD 310 may generate a POWER signal. When POWER is asserted, light emitting diode (LED) 342 is activated to let an operator know that the cable isolator is powered and functioning. PLD 310 may also generate an ON TIME signal. When ON TIME is asserted, LED 344 is activated to let an operator know that the cable isolator is in an "on time" state and the cable connection is not broken.

The example shown in FIG. 3 is not meant to imply architectural limitations. The components used to achieve the functionality of the cable isolator may vary depending upon the implementation. The example cable isolator shown in FIG. 3 may be embodied as cable isolator 220 in FIG. 2 and may be a stand-alone device or may be implemented as an expansion card in a workstation computer.

FIGS. 4A and 4B depict example on-time and off-time tables for a hardware controlled cable isolator in accordance with a preferred embodiment of the present invention. With reference to FIG. 4A, ON time table 410 illustrates the time in seconds that the cable is connected based on the on-time values. For example, if the on-time value is "1 4," then the transceivers are enabled for 240 seconds (4 minutes). As another example, if the on-time value is "0 B," then the transceivers are enabled for 150 seconds.

Turning to FIG. 4B, OFF time table 420 illustrates the time in seconds that the cable is disconnected based on the off-time values. For example, if the off-time value is "4," then the cable is disconnected for 10 seconds. As another example, if the off-time value is "C," then the cable is broken for 26 seconds.

The values shown in FIGS. 4A and 4B are exemplary and are not meant to imply structural limitations. The values themselves and the number of bits used to represent on-time and off-time values may vary depending on the implementation.

With reference now to FIG. 5, a flowchart illustrating the operation of a hardware controlled cable isolator is shown in accordance with a preferred embodiment of the present invention. The process begins and an operator supplies power to the cable isolator and connects the necessary cables for operation (step 502). Next, a determination is made as to whether the cable isolator is controlled by the programmable logic device or by an external device via the parallel port (step 504).

If the cable isolator is to be controlled by an external device, the operator connects the cable isolator parallel connector to a host computer parallel connector (step 506). Then, the operator opens a cable isolator application in the host computer (step 508) and controls the make/break times through the cable isolator application (step 510). Next, a determination is made as to whether an exit condition exists (step 512). An exit condition may exist, for example, when the operator closes the cable isolator application or powers down the cable isolator. If an exit condition does not exist, the process returns to step 510. If, however, an exit condition exists in step 512, the process ends.

Returning to step 504, if the cable isolator is to be controlled by the programmable logic device, the operator sets the make/break times using switches, knobs, dials, or jumpers (step 514). Thereafter, the PLD reads the new values from the switches (step 516) and adjusts the make/break timing control to output disable pins of the transceiver modules (step 518). Next, a determination is made as to whether an exit condition exists (step 520). An exit condition may exist, for example, when the operator powers down the cable isolator. If an exit condition does not exist, the process returns to step 518. If, however, an exit condition exists in step 520, the process ends.

Thus, the present invention solves the disadvantages of the prior art by providing a cable isolator mechanism for automatically making and breaking cable connections. The cable isolator mechanism resides between a host bus adapter and one or more storage devices. The cable isolator may be programmed, through either hardware or software, to accurately control the timing of the cable breaks. The mechanism for performing the cable breaks disables and enables transceivers that are well suited for 2 Gbps Fibre Channel signals, rather than using relays.

What is claimed is:

1. A method for testing an ability of a host bus adapter to recover from a cable break, comprising:
   a) providing a cable isolator connected between the host bus adapter and one or more storage devices, wherein the cable isolator includes a first transceiver connected to the host bus adapter and a second transceiver connected to the one or more storage devices;
   b) receiving an on time value and an off time value;
   c) automatically enabling at least one of the first transceiver and the second transceiver for an on time duration corresponding to the on time value; and
   d) automatically disabling the at least one of the first transceiver and the second transceiver for an off time duration corresponding to the off time value.

2. The method of claim 1, further comprising: repeating steps (c) and (d).

3. A method of using a cable isolator to test an ability of a host bus adapter to recover from a cable break, comprising:
   connecting the host bus adapter to a first transceiver of a cable isolator,
   connecting one or more storage devices to a second transceiver of the cable isolator;
   setting an on time value;
   setting an off time value; and
   activating the cable isolator to automatically enable at least one of the first transceiver and the second transceiver for an on time duration corresponding to the on time value and automatically disable the at least one of the first transceiver and the second transceiver for an off time duration corresponding to the off time value.

4. The method of claim 3, wherein the step of setting an on time value includes setting an on time selector switch.

5. The method of claim 4, wherein the stop of setting an on time value further includes setting an on time extension switch.

6. The method of claim 3, wherein the step of setting an off time value includes setting an off time selector switch.

7. A system for testing an ability of a host bus adapter to recover from a cable break, comprising:
   a workstation computer including a host bus adapter to be tested; and
   a cable isolator connected between the host bus adapter and one or more storage devices, wherein the cable isolator includes:
   a first transceiver connected to the host bus adapter;
   a second transceiver connected to the one or more storage devices;
   an on time selector switch for setting an on time value;
   an off time selector switch for setting an off time value; and
   a controller, wherein the controller automatically enables at least one of the first transceiver and the second transceiver for an on time duration corresponding to the on time value and automatically disables the at least one of the first transceiver and the second transceiver for an off time duration corresponding to the off time value.

8. The system of claim 7, wherein the cable isolator further includes an on time extension switch for extending the on time value to form an extended on time value and wherein the controller automatically enables the at least one of the first transceiver and the second transceiver for an on time duration corresponding to the extended on time value.

9. The system of claim 7, wherein the first transceiver includes a first output disable pin and the second transceiver includes a second output disable pin.

10. The system of claim 9, wherein the controller enables at least one of the first transceiver and the second transceiver by deasserting at least one of the first output disable pin and the second output disable pin.

11. The system of claim 9, wherein the controller disables at least one of the first transceiver and the second transceiver by asserting at least one of the first output disable pin and the second output disable pin.

12. The system of claim 7, wherein the cable isolator further includes:
   a communications adapter for receiving a first control signal; and
   a first switch, wherein responsive to the first switch being closed, the controller enables or disables the first transceiver according to the first control signal.

13. The system of claim 12, wherein the communications adapter receives a second control signal, wherein the cable isolator further includes a second switch, and wherein responsive to the second switch being closed, the controller enables or disables the second transceiver according to the second control signal.

14. The system of claim 7, wherein the controller is a programmable logic device.

15. The system of claim 7, wherein the first transceiver and the second transceiver are small form factor pluggable transceivers.

16. A cable isolator connected between a host bus adapter and one or more storage devices, wherein the cable isolator comprises:
   a first transceiver connected to the host bus adapter;
   a second transceiver connected to the one or more storage devices;
   an on time selector switch for setting an on time value;
   an off time selector switch for setting an off time value; and
   a controller, wherein the controller automatically enables at least one of the first transceiver and the second transceiver for an on time duration corresponding to the on time value and automatically disables the at least one of the first transceiver and the second transceiver for an off time duration corresponding to the off time value.

17. The cable isolator of claim 16, further comprising an on time extension switch for extending the on time value to form an extended on time value and wherein the controller automatically enables the at least one of the first transceiver and the second transceiver for an on time duration corresponding to the extended on time value.

18. The cable isolator of claim 16, wherein the first transceiver includes a first output disable pin and the second transceiver includes a second output disable pin.

19. The cable isolator of claim 18, wherein the controller enables at least one of the first transceiver and the second transceiver by deasserting at least one of the first output disable pin and the second output disable pin.

20. The cable isolator of claim 18, wherein the controller disables at least one of the first transceiver and the second transceiver by asserting at least one of the first output disable pin and the second output disable pin.

21. The cable isolator of claim 16, further comprising:
   a communications adapter for receiving a first control signal; and
   a first switch, wherein responsive to the first switch being closed, the controller enables or disables the first transceiver according to the first control signal.

22. The cable isolator of claim 21, further comprising:
   a communications adapter for receiving a second control signal; and
   a second switch, wherein responsive to the second switch being closed, the controller enables or disables the second transceiver according to the second control signal.

23. The cable isolator of claim 16, wherein the controller is a programmable logic device.

24. The cable isolator of claim 16, wherein the first transceiver and the second transceiver are small form factor pluggable transceivers.

* * * * *